United States Patent [19]
Hayes, Jr.

[11] 3,865,344
[45] Feb. 11, 1975

[54] RETAINING RING
[75] Inventor: Richmond S. Hayes, Jr., Fayetteville, N.Y.
[73] Assignee: Carrier Corporation, Syracuse, N.Y.
[22] Filed: Oct. 25, 1972
[21] Appl. No.: 301,699

[52] U.S. Cl. .............................................. 251/284
[51] Int. Cl. ........................................... F16k 51/00
[58] Field of Search ........ 251/284, 214, 318; 85/8.8

[56] References Cited
UNITED STATES PATENTS

| | | | |
|---|---|---|---|
| 1,774,994 | 9/1930 | Pfoutz | 251/284 X |
| 1,984,375 | 12/1938 | Johnston | 251/284 X |
| 2,179,460 | 11/1939 | White | 251/284 X |
| 2,309,338 | 1/1943 | Calaway | 251/284 |
| 2,491,310 | 12/1949 | Heimann | 85/8.8 |
| 2,525,928 | 10/1950 | McRae | 251/284 X |
| 2,950,132 | 8/1960 | Kocsuta | 85/8.8 X |
| 3,032,060 | 5/1962 | Huffman | 251/284 X |
| 3,052,258 | 9/1962 | Keller | 251/284 X |
| 3,481,360 | 12/1969 | Gillberg | 251/284 X |

FOREIGN PATENTS OR APPLICATIONS 217,765  6/1924  Great Britain ..................... 251/284

Primary Examiner—Charles J. Myhre
Assistant Examiner—Ira S. Lazarus
Attorney, Agent, or Firm—J. Raymond Curtin

[57] ABSTRACT

A device for retaining an externally threaded member inside a correspondingly internally threaded member against the exertion of torque on the members. One of the threaded members defines a circular groove and the other member defines a concentric shoulder, and the ring has at least three radial gripping fingers for engaging the shoulder to prevent the withdrawal of the externally threaded member from the other member.

2 Claims, 1 Drawing Figure

PATENTED FEB 11 1975
3,865,344
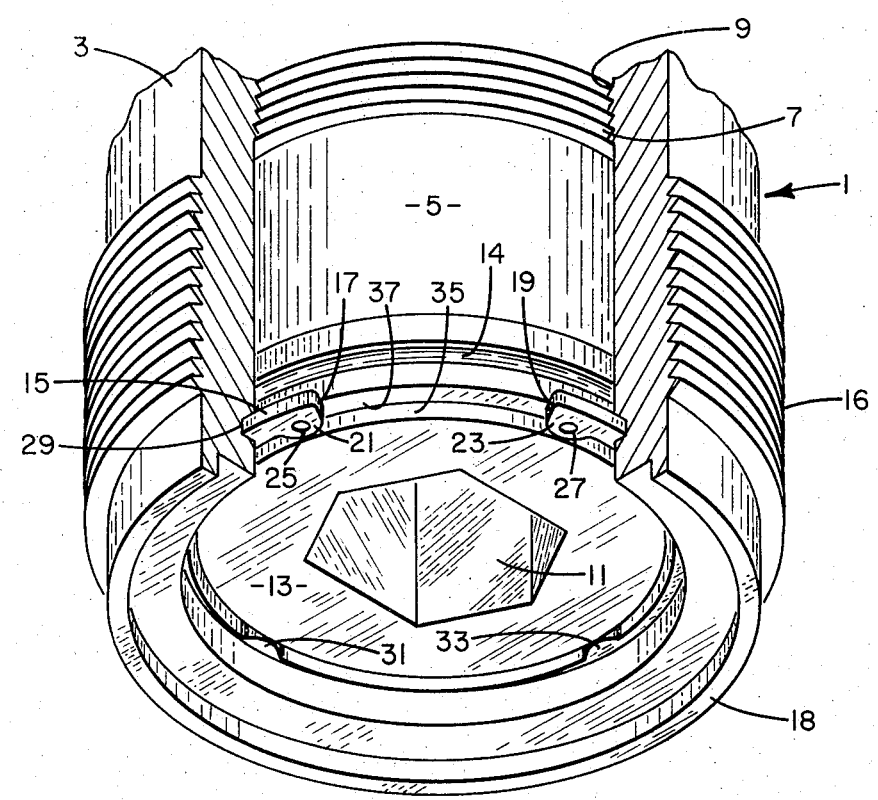

RETAINING RING

BACKGROUND OF THE INVENTION

1. Field of the Invention

This invention relates to retaining rings, and in particular to rings for retaining an externally threaded fluid valve stem inside a correspondingly internally threaded fluid valve body.

2. Description of the Prior Art

Refrigeration systems such as residential air conditioning systems frequently include units which are shipped separately to an installation site and are then connected in the field to render them operational. For instance, it is common for manufacturers of such air conditioning equipment to ship a system as two packages — one consisting of an evaporator coil assembly and the other consisting of a compressor-condenser fan assembly. The evaporator is normally installed inside the building being equipped and the compressor-condenser fan assembly is located outside the building. The two packages are connected by appropriate piping to form a refrigerant circulation system between the packages.

The general practice is to preload the compressor-condenser fan assembly with refrigerant, and to releasably confine the refrigerant therein by a fluid valve. Such valves usually comprise a valve body with various fluid ports, and a main passage for refrigerant flow. The valve body is provided with an internally threaded cylindrical cavity for receiving a correspondingly externally threaded valve stem. The valve stem has two operational positions. In one position, the valve stem blocks the fluid passage to prevent the flow of refrigerant therethrough. The valve stem is "front seated" and forms a fluid seal with a mating surface in the valve body. In the second position, the valve stem is withdrawn from the fluid passage to permit the flow of refrigerant. In opening the valve to the second position, it is important that the valve remain securely in the valve body since there is pressurized refrigerant flowing at its inner face through the aforementioned passage. If the valve stem were withdrawn completely or sufficiently to render it susceptible to inadvertent withdrawal, pressurized refrigerant would be ejected from the valve stem opening, possibly shooting the valve stem ahead of the refrigerant stream. Such an occurrence is obviously dangerous to persons near the valve and to surrounding equipment.

In order to prevent the removal of such a valve stem from the valve body, a known practice is to insert a retaining ring in the valve stem cavity outside of the free end of the valve stem. Retaining rings used for this purpose are sold under the trademark "Truarc," and comprise a flat, radially flexible open ring. The ring is assembled in the valve by drawing its open ends together with pliers having pins insertable in longitudinal holes in the ring ends, placing the contracted ring in the stem cavity, and releasing the ring so that it can expand into a circumferential groove in the cavity wall. With the ring so inserted, a serviceman opening the valve stem should sense the engagement of stem with the retaining ring, and be warned not to back the valve stem off any further. However, the use of these conventional retaining rings has not been entirely satisfactory.

The basic shortcoming of the foregoing retaining rings is that the serviceman cannot feel the engagement of the valve stem with the retaining ring as the former is unscrewed from the valve body. Hence, if the serviceman cannot see the retaining ring (as where the valve is in a blind location or where he is using a wrench which blocks his view of the ring), he may withdraw the valve stem too far and snap the ring out of the valve body. The latter situation may occur without the repairman realizing it, especially where he has been using a fast acting ratchet wrench.

Hence, it would be desirable to use a device for tactilely indicating to the repairman that the valve stem has been properly backed off, so that he need not rely on his observing the interior of the valve stem cavity. Such a device in the form of a modified retaining ring would be particularly desirable because such rings are inexpensive and easy to install.

Although, the above discussion relates to fluid valve assemblies, the invention to be described hereinafter contemplates related situations where a cylindrical member is inserted in the cylindrical cavity of a second member, and limited withdrawal of the inserted member is desired.

SUMMARY OF THE INVENTION

An object of the present invention is to retain a first member having a generally cylindrical exterior surface inside a second member having a mating interior surface.

Another object of the invention is to retain a first member having exterior threads in a second member having interior threads corresponding to the threads of the first member.

A more specific object of the invention is to provide means for retaining a threaded valve stem inside a corresponding valve body, against torque tending to remove the valve stem.

Still another object of the invention is to provide a torque resisting retaining ring whose location can be tactilely sensed to indicate the proper opening of a valve stem in a valve body and to prevent the inadvertent withdrawal of the stem. Other objects will be apparent to those skilled in the art from the description to follow and from the appended claims.

The foregoing objects are achieved according to a preferred embodiment of the invention by the provision of a generally flat, radially flexible open retaining ring having inner and outer peripheral surfaces, and at least three gripping fingers extending radially inwardly from the inner peripheral surface. The ring is intended for use with a generally cylindrical first member having external threads, which is insertable in a second member having internal threads engagable by the threads on the first member. The first member is provided with a recessed shoulder which is concentric with a groove in the second member when the members are assembled. The ring is adapted to be installed in the second member such that its outer peripheral surface engages the groove walls while the gripping fingers and inner peripheral surface are disposed in the withdrawal path of the first member. Thus, the fingers and inner peripheral surface are adapted to engage the shoulder surfaces of the first member to prevent its withdrawal beyond the predetermined position. The retaining ring thereby acts as a back stop for the first member.

BRIEF DESCRIPTION OF THE DRAWING

The drawing is a pictorial view of a preferred embodiment of the invention.

DESCRIPTION OF THE PREFERRED EMBODIMENT

The drawing shows a preferred embodiment of the invention as incorporated in a service valve assembly employed with refrigeration apparatus used in air conditioning equipment. The valve comprises a threaded valve body and a threaded valve stem assembled therein, and a retaining ring for preventing the valve stem from being unscrewed or otherwise removed from the valve body. For the sake of clarity, only those portions of the valve required for a description of the present invention are shown in the drawing.

Referring now to the drawing, numeral 1 designates a valve assembly in the condensing unit of refrigeration apparatus employed in an air conditioning machine. The valve comprises a valve body 3 and a valve stem 5 inserted in the valve body 3. The valve body is provided with interior threads 9 which are adapted to engage corresponding exterior threads 7 on valve stem 5 when the latter is inserted in valve body 3. A recessed wrench socket 11 is defined in the end surface 13 of valve stem 5 for receiving an Allen wrench to install and operate the stem in the valve body by imparting rotary motion to the stem. Valve stem 5 has two operative positions — to a closed position in which it is fully inserted in valve body 3 so that its front surface (not shown) seats against the valve body to seal the valve against refrigerant flow and an open position as shown in the drawing. If the end surface 13 of valve stem 15 is disposed close to the ground or to another piece of machinery, it can have a "blind location" precluding a view of that end when the stem is to be opened in the valve body. In such cases, adjustment of a stem to the open position must be accomplished by one's sense of touch. Valve assembly 1 further includes an O-ring 14 for preventing refrigerant leakage around valve stem 5. External screw threads 16 are provided on valve body 3 to enable the mounting of a protective cap over end 13 of stem 5 which preferably seats on lip 18 to prevent refrigerant leakage when the valve stem is open.

Valve 1 is employed with a fluid system capable of exerting substantial fluid pressure, and it is very important the refrigerant be confined to the system. It is particularly important that in opening valve stem 5, the stem remain functional in preventing the escape of refrigerant through the opening in valve body 3 in which the stem is inserted. Hence, it is imperative that threads 7 and 9 remain engaged when stem 5 is opened, for the ejection of the stem could irreparably damage the valve. Moreover, the refrigerant is itself very dangerous, and it could eject the valve stem with considerable force.

In order to assure the retention of valve stem 5 in the valve body, a flat retaining ring 15 is provided to serve as a stop to block the withdrawal of valve stem 5 beyond a point determined by the amount of thread engagement of threads 7, 9 required to withstand the refrigerant pressure. Ring 15 has an "open" configuration in that it has non-connected ends 17 and 19. Ring 15 is preferably fabricated by a conventional stamping process from a resilient metal. The ring should have an unstressed or normal configuration to which it tends to return upon being distorted therefrom. FIGS. 21 and 23 extend radially inwardly on ring 15, and parallel holes 25 and 27 extend through the fingers in a direction transverse to the plane of the ring. The foregoing design makes possible the easy contraction of the retaining ring by means of pliers provided with pins adapted to enter holes 25 and 27 and to draw the ends 17 and 19 together.

Retaining ring 15 is adapted to block the withdrawal path of valve stem 5 from the valve body. An internal groove 29 is provided in the valve body for receiving the outer peripheral portion of ring 15. The outer diameter of the unstressed ring should be greater than the outer diameter of groove 29, so that the ring will be urged against the groove wall when the ring is installed therein.

In order to prevent the excessive withdrawal of stem 5 when the latter is turned to open the valve, ring 15 should exert strong resistance to the torque on stem 5. Such resistance tactilely indicates the presence and location of the ring, and prevents the unintended removal of the ring by the valve stem. It has been found that by providing at least three radially inwardly extending protuberances or fingers on ring 15, which are preferably equidistant from each other, for engaging the end face of valve stem 5, excellent results can be attained. Accordingly, fingers 31 and 33 are provided in addition to fingers 21 and 23 for engaging stem 5. A shoulder, defined by an abutment surface 35 which is concentric with the generally cylindrical exterior of valve stem 5 and a surface 37 transverse to surface 35, is provided on the end portion of valve stem 5. This shoulder is located so that the upper inner peripheral surfaces of ring 15 and fingers 21, 23, 31, 33 (as viewed in the drawing) are firmly engagable with the shoulder when the stem is opened sufficiently.

Thus, when ring 15 is installed in the groove in the valve body and valve stem 5 is turned to its open position, the surface 37 of the valve stem abuts the upper horizontal surface of the fingers, and surface 35 engages the inner vertical surface of the fingers. This engagement of adjacent transverse surfaces of ring 15 prevents the ring from buckling in an axial direction when the usual force for removing a valve stem is applied to valve stem 5. (In prior art retaining rings, only the upper, inner horizontal surface of the ring would be engagable by the valve stem, so that if the stem were backed off against it, the inner peripheral portion would become axially displaced from the outer peripheral portion. The result would be that only a minimal part of the end surface of the stem would engage the ring, and the counter-torque exerted by the ring would be accordingly small).

In order to assemble the valve components, stem 5 is screwed into valve body 3, advantageously by means of an Allen wrench inserted into socket 11. An appropriate retaining ring 15 is then installed in groove 29, preferably by grasping and drawing together ends 17 and 19 with pliers of the type described previously. The ring is then oriented to be concentric with the groove, and released so that it expands into the groove. After the valve has been assembled with the condenser unit of an air conditioning system, the valve is closed or "front seated" and the unit is delivered to its installation site. At the appropriate time, valve stem 5 is "backed off" or opened towards retaining ring 15 until the strong resistance of the ring is felt, indicating the proper positioning of the stem.

The foregoing description indicates that the objects of the invention have been achieved. The invention has thus provided means for retaining a first member such as a fluid valve stem inside a mating second member of fluid valve body, against an applied torque. The exact location of the retaining member can be readily sensed even if in a blind location, by virtue of the resistance encountered when the second member or valve stem is backed off against it.

The invention has been described in detail with particular reference to a preferred embodiment thereof, but it will be understood that variations and modification can be effected within the spirit and scope of the invention.

I claim:
1. The combination comprising:
a valve body having a threaded cylindrical bore and a groove formed near one end of said bore;
a cylindrical valve stem having external threads in engagement with the threads of said cylindrical bore and a section of reduced diameter at one end of said stem defining a shoulder; and
a generally flat, flexible open retaining ring having inner and outer peripheral surfaces and at least three radial gripping fingers extending from the inner peripheral surface, the outer peripheral surface being disposed in said groove of the valve body and the gripping fingers being in opposing alignment with said shoulder, said gripping fingers engaging said shoulder and countering the exertion of torque on the second member when the first member is moved against the ring.

2. A device according to claim 1 wherein said gripping fingers are equidistant from each other.

* * * * *